United States Patent
Ueda

(10) Patent No.: US 10,637,290 B2
(45) Date of Patent: Apr. 28, 2020

(54) SYSTEMS AND METHODS FOR CHARGING WIRELESS AUDIO DEVICES

(71) Applicant: Bose Corporation, Framingham, MA (US)

(72) Inventor: Joji Ueda, Cambridge, MA (US)

(73) Assignee: Bose Corporation, Framingham, MA (US)

( * ) Notice: Subject to any disclaimer, the term of this patent is extended or adjusted under 35 U.S.C. 154(b) by 82 days.

(21) Appl. No.: 16/100,842

(22) Filed: Aug. 10, 2018

(65) Prior Publication Data

US 2020/0052526 A1 Feb. 13, 2020

(51) Int. Cl.
*H02J 50/10* (2016.01)
*H02J 7/00* (2006.01)
*H04R 1/10* (2006.01)

(52) U.S. Cl.
CPC ............ *H02J 50/10* (2016.02); *H02J 7/0047* (2013.01); *H04R 1/1016* (2013.01); *H04R 1/1025* (2013.01)

(58) Field of Classification Search
CPC .......................................... H02J 50/10
USPC ........................................... 320/108
See application file for complete search history.

(56) References Cited

U.S. PATENT DOCUMENTS

| | | | |
|---|---|---|---|
| 2011/0006736 A1* | 1/2011 | Robinson | H02J 7/0031 320/134 |
| 2015/0271673 A1 | 9/2015 | Lord et al. | |
| 2016/0134961 A1* | 5/2016 | Shaffer | H04R 1/1016 381/74 |

OTHER PUBLICATIONS

International Search Report and the Written Opinion of the International Searching Authority, International Application No. PCT/US2019/044841, pp. 1-13, dated Oct. 30, 2019.

\* cited by examiner

*Primary Examiner* — Edward Tso
*Assistant Examiner* — Ahmed H Omar
(74) *Attorney, Agent, or Firm* — Bond, Schoeneck & King, PLLC

(57) ABSTRACT

A wireless audio device, charging system, and method of charging a battery. The wireless audio device includes a communication module configured to enable the wireless audio device to communicate wirelessly and a battery. A charging interface is configured to establish a power transfer connection to the battery from a power source. A memory is configured to store paired history data indicating that the wireless audio device has been paired to an audio source upon the audio device being wirelessly paired. A controller is configured to detect the power transfer connection, determine a charge level of the battery, check the memory for the paired history data, and generate a control signal for selectively disabling the power transfer connection to prevent the charge level from exceeding a preset threshold unless the memory contains the paired history data.

20 Claims, 3 Drawing Sheets

SYSTEMS AND METHODS FOR CHARGING WIRELESS AUDIO DEVICES

BACKGROUND

The disclosure relates to battery charging systems and methods, and, particularly, to systems and methods for charging wireless audio devices.

SUMMARY

All examples and features mentioned below can be combined in any technically possible way.

In one aspect, a wireless audio device includes a communication module configured to enable the wireless audio device to communicate wirelessly; a battery; a charging interface configured to establish a power transfer connection to the battery from a power source; a memory configured to store paired history data indicating that the wireless audio device has been paired to an audio source upon the audio device being wirelessly paired; and a controller configured to detect the power transfer connection; determine a charge level of the battery; check the memory for the paired history data; and generate a control signal for selectively disabling the power transfer connection to prevent the charge level from exceeding a preset threshold unless the memory contains the paired history data.

In another aspect, a charging system includes the wireless audio device and the power source, wherein the power source is arranged as a charging case. In one example, the power transfer connection is automatically established between the battery of the wireless audio device and an auxiliary battery of the charging case when the wireless audio device is arranged in the charging case. In one example, the charging case comprises a switch configured to selectively disable the power transfer connection based on the control signal. In one example, the controller comprises a first controller comprised by the charging case and a second controller comprised by the wireless audio device.

In one example, the wireless audio device further comprising a switch configured to selectively disable the power transfer connection based on the control signal. In one example, the switch is located between the battery and the charging interface. In one example, the switch comprises an electrical relay, a metal-oxide-semiconductor field-effect transistor (MOSFET), or a combination comprising at least one of the foregoing. In one example, the wireless audio device comprises one or more headphones. In one example, the charging interface comprises a conductive element, an induction coil, or a combination comprising at least one of the foregoing.

In another aspect, a portable charging case for a wireless audio device may include a charging interface configured to establish a power transfer connection with the wireless audio device; an auxiliary battery configured to charge a battery of the wireless audio device via the power transfer connection; a controller configured to: receive a control signal from the wireless audio device; and disable the power transfer connection in response to the control signal to prevent a charge level of the battery from exceeding a preset threshold.

In one example, the controller comprises a switch configured to disable the power transfer connection. In one example, the charging case further comprises a receptacle complementarily formed to receive the wireless audio device therein. In one example, the receptacle is configured to automatically establish the power transfer connection via the charging interface when the wireless audio device is received in the receptacle. In one example, the control signal comprises a charge level of the battery.

In another aspect, a method of selectively charging a battery of a wireless audio device includes detecting a power transfer connection between a battery of the wireless audio device and a power source; determining a charge level of the battery; checking memory of the wireless audio device for paired history data that indicates that the wireless audio device has wirelessly paired to one or more audio sources; and generating a control signal to disable the power transfer connection to prevent the charge level from exceeding a preset threshold unless the memory contains the paired history data.

In one example, the power transfer connection is disabled via operation of a switch. In one example, the detecting, checking, determining, and generating are performed by a controller of the wireless audio device. In one example, the controller comprises a state of charge sensor that is configured to perform the determining. In one example, the method further includes permitting the battery to fully charge if the paired history data is identified.

DETAILED DESCRIPTION

Figure 1:
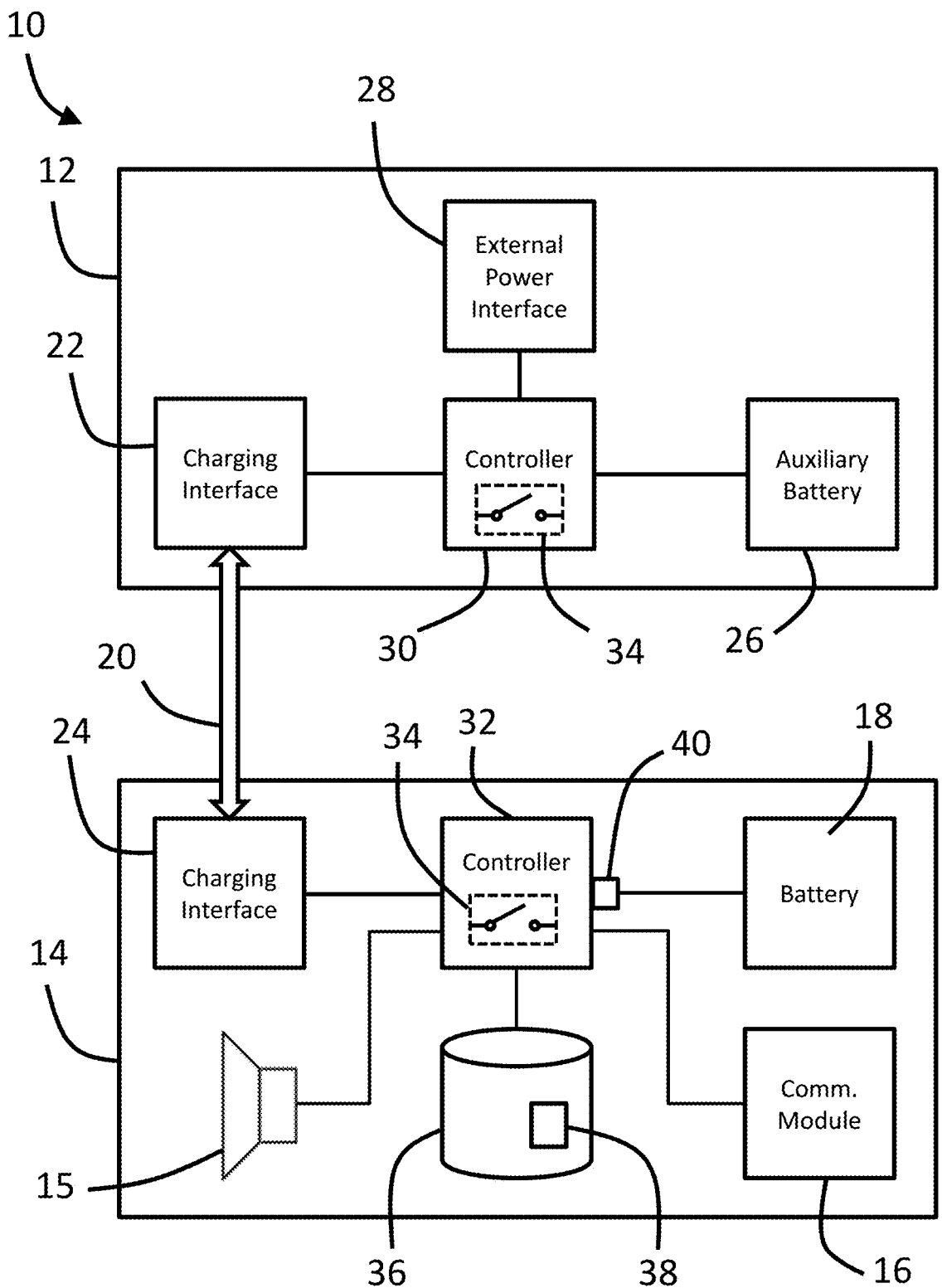
FIG. 1 is a block diagram schematically illustrating a charging system for a wireless audio device according to one example disclosed herein.

The present disclosure describes various systems and methods for charging a wireless audio device, particularly for selectively implementing and disabling a threshold limit on the level that the charge of a battery of the wireless audio device is permitted to reach.

To enable a satisfactory "out of the box" experience for an end user of an electronic device, it is often desired for the battery of the electronic device (such as a wireless audio device), to be charged (so that the user can immediately begin using the electronic device without having to first wait for the batteries of the device to charge). However, for various reasons such as stability, safety, and/or to abide by applicable laws or regulations, it may be necessary or desirable to limit or cap the maximum charge level permitted for the batteries during events such as long term storage or transport. For example, these considerations may be of particular interest for certain battery types, such as lithium-ion batteries, and/or may be applicable to battery-containing electronic devices during warehousing and distribution before the electronic devices are sold to, or otherwise acquired by, end users. This threshold limit or cap ("threshold") may be expressed, for example, as a percentage of a maximum possible charge for the battery (i.e., X% of maximum charge, where 'X' is any number less than 100).

As described herein, a battery-containing wireless audio device may be coupled together with a portable power source (such as a charging case for the wireless audio device), during storage, distribution, sale, etc. For example, the portable power source may include an auxiliary battery that is configured to recharge the main battery of the wireless audio device when the wireless audio device and the portable power source are arranged together. This introduces one consideration in that under normal usage, the wireless audio device will attempt to charge its own batteries beyond its maximum state of charge whenever arranged with a portable power source (e.g., placed inside a charging case), thereby violating the imposed threshold.

Additionally, it is generally undesirable to permanently implement such a threshold, as doing so would hinder the performance of the wireless audio device. Accordingly, the wireless audio device may be arranged to transition between a first mode (e.g., "restricted charging mode") in which the battery can only charge to the threshold, and a second mode (e.g., "normal charging mode") in which the battery can fully charge. As noted above, the restricted charging mode may be particularly relevant to initial shipment of the wireless audio devices, e.g., from a manufacturing factory or warehouse to a retail store or other point of sale. Thus, it can be desirous to remove the restriction effected by the threshold after the wireless audio device has reached the end user.

In examples disclosed herein, the wireless audio device is configured to disable any imposed threshold on the charge level of its battery if it detects stored data indicating that the wireless audio device has been connected or paired to an audio source (e.g., smartphone, laptop, or other remote computing device). That is, since a wireless audio device requires a remote audio source to provide audio data, pairing to such a device is essentially necessary for an end user to actually make use of the wireless audio device. It is therefore expected that pairing to an audio source would be one of the first actions taken by an end user upon obtaining the wireless audio device. Advantageously, this enables the battery of the wireless audio device to automatically transition into the normal charging mode as a result of a user simply using the wireless audio device in a routine manner. Furthermore, this enables the wireless audio device to be shipped together with a portable power source, with each having at least partially charged batteries, and without risk of violating any preset threshold on the charge level of the batteries.

FIG. 1 schematically depicts a charging system 10 having a power source 12 and a wireless audio device 14. The wireless audio device 14 may be or include any number of audio devices, such as headphones, earphones, earbuds, headsets, etc. Additionally, the wireless audio device may be or include any wearable device intended to be worn on or about a user's head or ears, such as a pair of glasses, a helmet, a hat, and various other types of devices such as head, shoulder or body-worn acoustic devices that include or are connected to one or more acoustic drivers to produce sound, with or without contacting the ears of a user. To this end, the wireless audio device 14 includes a speaker 15 configured to produce sound in response to an audio signal sent to the speaker.

The wireless audio device 14 includes a communication module 16 that enables it to wirelessly transmit and/or receive information, such as streamed audio data (converted into sound output by the speaker 15) and/or control commands from a remote audio source. Remote audio sources may include a smartphone, laptop, desktop computer, tablet, or other computing device in communication with the wireless audio device 14 via the communication module 16. Any desired wireless technology, standard, or protocol may be used, such as Bluetooth, Wi-Fi, etc. The wireless audio device 14 includes a battery 18 to enable wireless operation of the wireless audio device 14 when it is not connected to any external power source (such as a headphone jack utilized by typical wired audio devices).

The portable power source 12 may be any device external to the wireless audio device 14 that is configured to charge the wireless audio device 14 when arranged together, such as a case, housing, or container for holding and/or protecting the wireless audio device 14 when the wireless audio device 14 is not in use, during transit or storage, etc. The power source 12 is intended to charge the battery 18 of the wireless audio device when an electrical or power transfer connection 20 is formed between a charging interface 22 of the power source 12 and a charging interface 24 of the wireless audio device. The charging interfaces 22 and 24 may be electrical contacts that are physically engaged together to create an electrical connection therebetween. In another example, the charging interfaces 22 and 24 may include components arranged for inductive charging when brought into proximity of each other, such as induction coils. If desired, the power transfer connection 20 may be managed or controlled via any technology, standard, or protocol, such as Universal Serial Bus (USB), Qi, etc.

In order to provide power to the battery 18 via the power transfer connection 20, the power source 12 includes an auxiliary battery 26 and/or an external power interface 28 in communication with the charging interface 22. The auxiliary battery 26 may generally resemble the battery 18 and/or be of a different type or capacity (such as having a greater capacity). Similarly, the external power interface 28 may be arranged akin to the charging interface 22 as discussed above, e.g., using the same or different standards, protocols, and/or technologies than the charging interface 22 and 24. For example, the external power interface 28 may be adapted to plug into a wall outlet for transferring power to the wireless audio device 14 via the charging interfaces 22 and 24.

Figure 2:
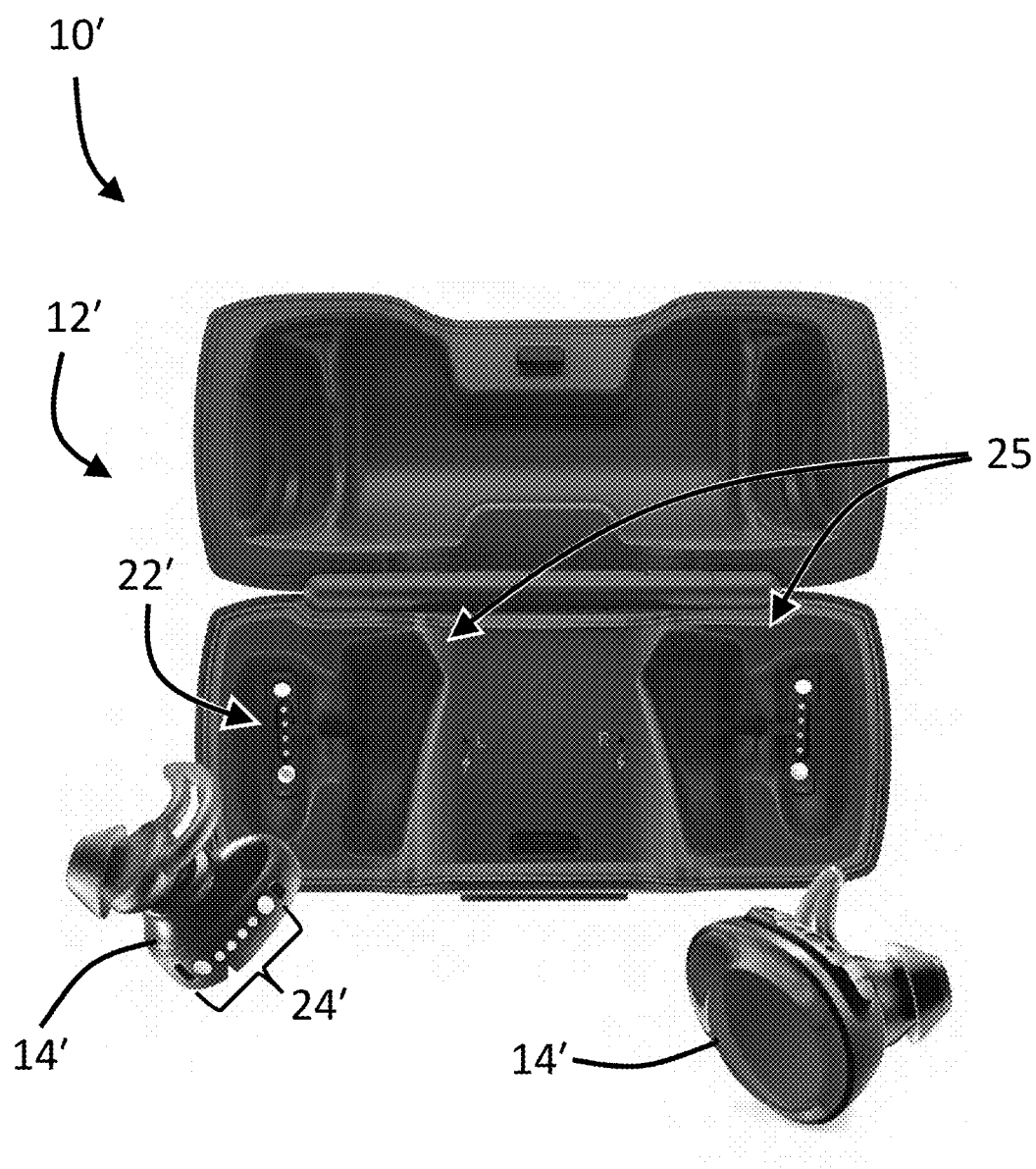
FIG. 2 illustrates a pair of wireless headphones and a charging case for forming a charging system according to one example disclosed herein.

To facilitate description of the features and structures outlined above and herein, one specific and non-limiting example is illustrated in FIG. 2 and referred to as a system 10'. It is to be appreciated the components of the system 10' generally analogous to those of the system 10 have been provided with reference numerals appended by prime symbols ('). To this end, the system 10' includes a charging case 12' as one example for the portable power source 12, and a pair of wireless headphones 14' as one example for the wireless audio device 14. One commercially available example for the charging case 12' and the headphones 14' includes the SoundSport® Free headphones and accessories sold by Bose Corporation. However, it is again to be appreciated that this is merely one example and that the systems and methods disclosed herein are applicable to other audio devices.

The charging case 12' is arranged, e.g., with receptacles or compartments 25 to receive the wireless headphones 14'. The receptacles 25 can be complementarily formed with respect to the shape of the wireless headphones 14' such that a first set of electrical contacts 22' of the charging case 12' (forming one example for the charging interface 22) is aligned with a second set of contacts 24' of the wireless headphones 14' (forming one example for the charging interface 24), thereby establishing a power transfer connection (e.g., as described with respect to the power transfer connection 20).

Referring back to FIG. 1, the operation of the portable power source 12 and the wireless audio device 14 (including with respect to the transfer of power from the portable power source 12 to the wireless audio device 14), may be managed, controlled, or facilitated respectively by a controller 30 in the power source 12 and/or a controller 32 in the wireless audio device 14. The controllers 30 and 32 may arranged as processors and/or include any suitable software and hardware useful for implementing the features and functionality described here.

Either or both of the controllers 30 and 32 may include, or be in communicable control of, a switch 34 that is arranged to selectively disable and enable the power transfer connection to the battery 18. For example, the switch 34 (or multiple switches) may be positioned at any desired location or locations, such as between the auxiliary battery 26 and the charging interface 22, between the external power interface 28 and the charging interface 22, between the charging interface 24 and the battery 18, etc. The switch 34 may be a mechanical switch that includes movable parts that physically decouples an electrical connection such as an electrical relay, an analog switch without movable parts such as a MOSFET, etc.

The controller 32 includes or is in communication with a memory module 36, which may take any desired form known in the art, such solid-state or other non-volatile memory formats. Upon connection or pairing (these terms used interchangeably herein) of the wireless audio device 14 to an audio source (such as Bluetooth pairing with a smartphone or other remote computing device), the wireless audio device 14 is configured (via the controller 32) to store information pertaining to the paired audio source in the memory module 36. This stored information is referred to herein and represented in the figures as paired history data 38.

The paired history data 38 may include a serial or identification number, nickname, manufacturer name, device model (e.g., brand name), media access control ("MAC") address, globally unique identifier ("GUID"), etc. of the audio sources that have been previously paired to the wireless audio device 14. In other words, the paired history data 38 enables the wireless audio device 14 to "remember" which audio source devices it has connected to previously, e.g., for facilitating future or repeated connections to the remembered devices. The paired history data 38 may be stored as part of the protocols or standards utilized by the communication module 16, e.g., in accordance with standard Bluetooth protocols. In this way, the paired history data 38 enables the wireless audio device 14 to "know" whether or not it has paired or connected to audio sources and/or to which audio sources the wireless audio device 14 has previously paired. "Previously paired" is intend to include audio sources that are still currently paired to the wireless audio device 14.

The controller 32 of the wireless audio device 14 also includes, or is in communication with, a state of charge (SOC) sensor 40 for assisting in determination of the charge level for the battery 18. For example, the SOC sensor 40 may measure current, voltage, or any other parameter indicative of or correlating to the state of charge of the battery 18. The controller 32 may include an algorithm (e.g., stored in the memory module 36) from which the state of charge of the battery 18 can be estimated or determined based on the parameters measured by the sensor 40.

In accordance with the disclosure above and herein, the system 10 may be configured to transition between a restricted charging mode (in which the battery 18 can only charge partially to a preset threshold) and a normal charging mode (in which the battery 18 can fully charge). In view of the above, the switch 34 may be utilized to selectively disable the power transfer connection 20, thereby preventing the battery 18 from charging above the preset threshold, when in the restricted charging mode. A "threshold" for the battery 18, as referred to herein, may generally be any amount less than 100% of the total maximum charge of the battery 18. For example, the threshold may be set as about 10%, 30%, 50%, 70%, or some other percentage of a maximum possible charge for the battery 18. In one example, the threshold may be set as a quantified value of a battery-related parameter as opposed to a percentage, e.g., a value for battery capacity as measured by mAh or other unit.

In accordance with examples disclosed herein, the paired history data 38 may be used as a trigger for disabling the implementation of a preset threshold on the charge level of the battery 18. More specifically, when the power transfer connection 20 is established or detected, the controller 32 may attempt to retrieve the paired history data 38 from the memory module 36. If the paired history data 38 indicates that the wireless audio device 14 has previously paired to an audio source, then the system 10 will transition to the normal charging mode. For example, if the paired history data 38 indicates that the wireless audio device 14 has been previously paired to an audio source, then the switch 34 can be closed or otherwise activated to enable the battery 18 to charge normally. On the contrary, if the paired history data 38 is non-existent and/or otherwise fails to indicate that the wireless audio device 14 has been previously paired to an audio source, then the preset threshold can be implemented to limit the degree to which the battery 18 can be charged.

It is to be appreciated that the determination and control of the system 10 between the restricted charging mode and the normal charging mode can be controlled by either the controller 30 or the controller 32, in particular depending on where the switch 34 is implemented. For example, the control signal generated by the controller 32 may simply include the paired history data 38 or data indicative of whether the paired history data 38 exists, is missing, or is empty, which is communicated to the controller 30 (e.g., the portable power source 12 may include a communication module akin to the communication module 16 and/or the charging interfaces 22 and 24 may be arranged for signal communication between the controllers 30 and 32). In other examples, the control signal generated by the controller 32 may include a specific command or instruction to open/close the switch 34.

Figure 3:
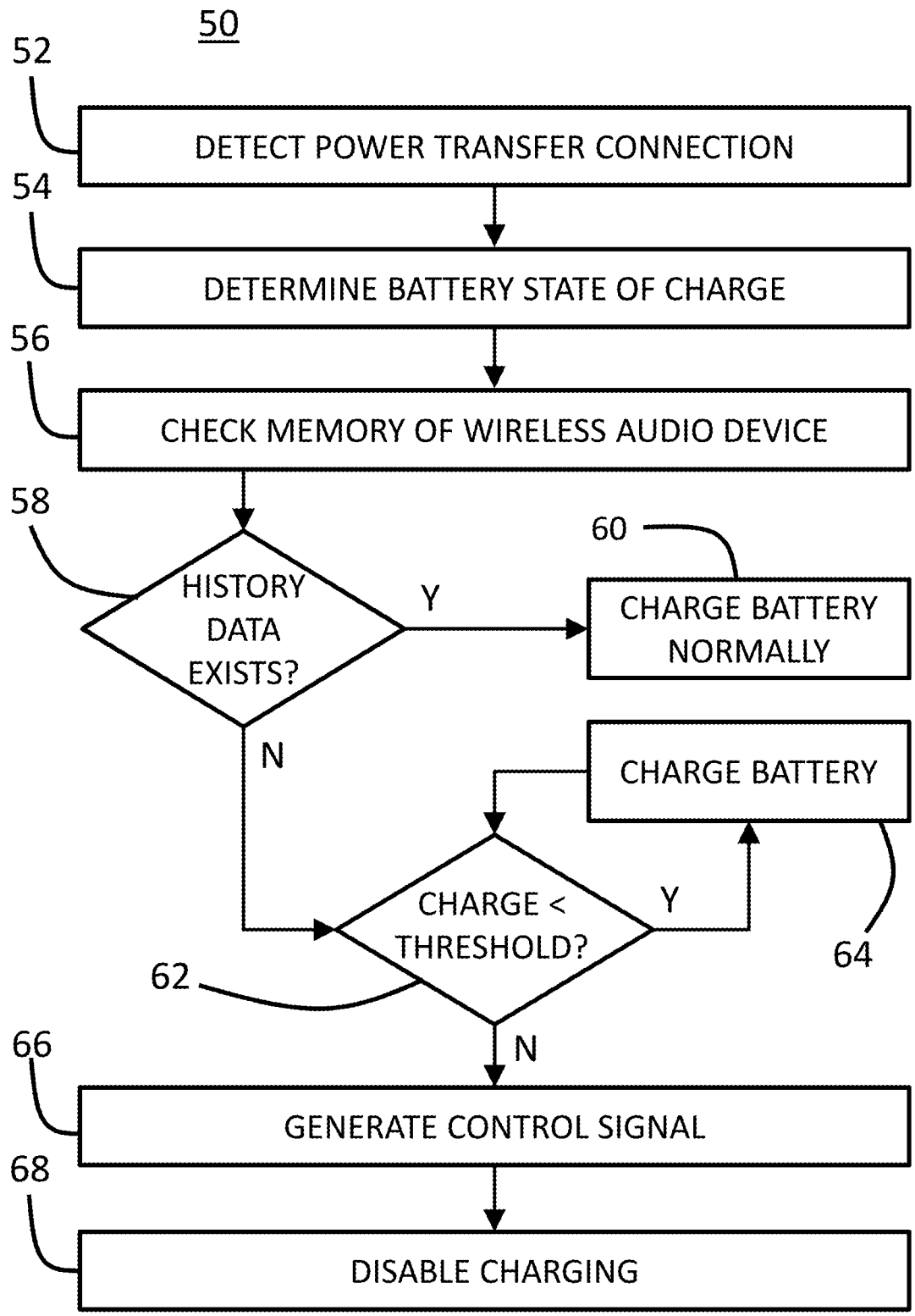
FIG. 3 is a flow chart illustrating a method of charging a wireless audio device according to one example disclosed herein.

A method 50 for operating a charging system, e.g., the system 10, is illustrated in FIG. 3. At step 52, a power transfer connection (e.g., the power transfer connection 20) is detected between a portable power source (e.g., the portable power source 12) and a wireless audio device (the wireless audio device 14). A controller of the portable power source and/or the wireless audio device 14 may be utilized (e.g., by the controller 30 and/or 32). At step 54, a state of charge of a battery (e.g., the battery 18) of the wireless audio device is determined (e.g., via the SOC sensor 40).

At step 56, the method includes checking the memory (e.g., the memory module 36) of the wireless audio device (e.g., via the controller 32). At step 58 it is determined whether any historic pairing data exists that indicates that the wireless audio device was previously paired to an audio source (e.g., the paired history data 38). If such data exists, then the battery is charged normally at step 60 (e.g., the system is transitioned to a normal charging mode). If no data can be found that indicates a previous pairing by the wireless audio device, then the method 50 may simply terminate without permitting the battery to charge. In another example, the method 50 proceeds to step 62.

At step 62, it is determined (e.g., via the controller 30 and/or 32) whether the state of charge of the battery determined in step 54 is greater than the preset threshold for the battery. If the charge is less than the preset threshold, then the battery is permitted to charge (e.g., by closing the switch 34) at step 64. The step 64 will continue to loop through the step 62 until the state of charge of the battery reaches the preset threshold. When the preset threshold is reached, step 62 proceeds to step 66 at which the controller of the wireless audio device generates a control signal. For example, the control signal may include paired history data, a variable indicative of the contents of the paired history data, or a specific instruction to operate a component to break the power transfer connection to the battery of the wireless audio device. At step 68 charging of the battery of the wireless audio device is disabled, such as by breaking or interpreting the power transfer connection between the battery and the auxiliary battery of the portable power source (e.g., via manipulation of the switch 34). The method 50 may be cycled or repeated periodically as desired to continue to check whether the paired history data exists.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

The invention claimed is:

1. A wireless audio device, comprising:
 a communication module configured to enable the wireless audio device to communicate wirelessly;
 a battery;
 a charging interface configured to establish a power transfer connection to the battery from a power source;
 a memory configured to store paired history data indicating that the wireless audio device has been paired to an audio source upon the audio device being wirelessly paired; and
 a controller configured to:
  detect the power transfer connection;
  determine a charge level of the battery;
  check the memory for the paired history data; and
  generate a control signal for selectively disabling the power transfer connection to prevent the charge level from exceeding a preset threshold unless the memory contains the paired history data.

2. A charging system comprising the wireless audio device and the power source of claim 1, wherein the power source is arranged as a charging case.

3. The charging system of claim 2, wherein the power transfer connection is automatically established between the battery of the wireless audio device and an auxiliary battery of the charging case when the wireless audio device is arranged in the charging case.

4. The charging system of claim 2, wherein the charging case comprises a switch configured to selectively disable the power transfer connection based on the control signal.

5. The charging system of claim 2, wherein the controller comprises a first controller comprised by the charging case and a second controller comprised by the wireless audio device.

6. The wireless audio device of claim 1, further comprising a switch configured to selectively disable the power transfer connection based on the control signal.

7. The wireless audio device of claim 6, wherein the switch is located between the battery and the charging interface.

8. The wireless audio device of claim 7, wherein the switch comprises an electrical relay, a MOSFET transistor, or a combination comprising at least one of the foregoing.

9. The wireless audio device of claim 1, comprising one or more headphones.

10. The wireless audio device of claim 1, wherein the charging interface comprises a conductive element, an induction coil, or a combination comprising at least one of the foregoing.

11. A portable charging case for a wireless audio device, comprising:
 a charging interface configured to establish a power transfer connection with the wireless audio device;
 an auxiliary battery configured to charge a battery of the wireless audio device via the power transfer connection;
 a controller configured to:
 receive a control signal from the wireless audio device, wherein the control signal comprises data indicative of whether paired history data is contained in a memory of the wireless audio device; and
 disable the power transfer connection in response to the control signal to prevent a charge level of the battery from exceeding a preset threshold unless the memory contains the paired history data.

12. The portable charging case of claim 11, wherein the controller comprises a switch configured to disable the power transfer connection.

13. The portable charging case of claim 11, comprising a receptacle complementarily formed to receive the wireless audio device therein.

14. The portable charging case of claim 13, wherein the receptacle is configured to automatically establish the power transfer connection via the charging interface when the wireless audio device is received in the receptacle.

15. The portable charging case of claim 11, wherein the control signal comprises a charge level of the battery.

16. A method of selectively charging a battery of a wireless audio device comprising:
 detecting a power transfer connection between a battery of the wireless audio device and a power source;
 determining a charge level of the battery;
 checking memory of the wireless audio device for paired history data that indicates that the wireless audio device has wirelessly paired to one or more audio sources; and
 generating a control signal to disable the power transfer connection to prevent the charge level from exceeding a preset threshold unless the memory contains the paired history data.

17. The method of claim 16, wherein the power transfer connection is disabled via operation of a switch.

18. The method of claim 16, wherein the detecting, checking, determining, and generating are performed by a controller of the wireless audio device.

19. The method of claim 16, wherein the controller comprises a state of charge sensor that is configured to perform the determining.

20. The method of claim 16, further comprising permitting the battery to fully charge if the paired history data is identified.

* * * * *